US009936049B2

(12) United States Patent
Vajravel

(10) Patent No.: US 9,936,049 B2
(45) Date of Patent: Apr. 3, 2018

(54) PROTOCOL INDEPENDENT WAY FOR DYNAMICALLY SELECTING DATA COMPRESSION METHODS FOR REDIRECTED USB DEVICES

(71) Applicant: Dell Products L.P., Round Rock, TX (US)

(72) Inventor: Gokul Thiruchengode Vajravel, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 246 days.

(21) Appl. No.: 14/812,572

(22) Filed: Jul. 29, 2015

(65) Prior Publication Data

US 2017/0034315 A1 Feb. 2, 2017

(51) Int. Cl.

| | |
|---|---|
| ***G06F 13/20*** | (2006.01) |
| ***G06F 13/00*** | (2006.01) |
| ***H04L 29/06*** | (2006.01) |
| ***G06F 13/42*** | (2006.01) |

(52) U.S. Cl.

CPC .......... *H04L 69/04* (2013.01); *G06F 13/4282* (2013.01); *H04L 69/22* (2013.01)

(58) Field of Classification Search

None

See application file for complete search history.

(56) References Cited

U.S. PATENT DOCUMENTS

| | | | | |
|---|---|---|---|---|
| 8,010,630 | B2 | 8/2011 | Barreto et al. | |
| 8,244,852 | B2 * | 8/2012 | Plamondon | H03M 7/30 382/124 |
| 8,275,909 | B1 * | 9/2012 | Rothstein | H03M 7/30 375/240 |
| 2006/0195660 | A1 * | 8/2006 | Sundarrajan | H04L 67/2852 711/118 |
| 2011/0022812 | A1 * | 1/2011 | van der Linden | G06F 9/5077 711/163 |
| 2016/0021430 | A1 * | 1/2016 | LaBosco | H04N 21/4398 725/31 |
| 2016/0027399 | A1 * | 1/2016 | Wilde | G06F 13/382 345/520 |

* cited by examiner

*Primary Examiner* — Michael Sun
(74) *Attorney, Agent, or Firm* — Baker Botts L.L.P.

(57) ABSTRACT

In certain information handling system environments, physical devices connected to a client are redirected to a server or other information handling system. Each of these physical devices will use and occupy network bandwidth, for example, during transmission of a data packet. Dynamically selecting a compression method for the data packet based, at least in part on, the type of data or payload in the data packet may reduce the amount of network bandwidth required by a particular device, for example a USB device that has been redirected.

17 Claims, 5 Drawing Sheets

PROTOCOL INDEPENDENT WAY FOR DYNAMICALLY SELECTING DATA COMPRESSION METHODS FOR REDIRECTED USB DEVICES

TECHNICAL FIELD

This disclosure generally relates to compression and decompression and, in particular, relates to dynamically selecting data compressions methods for redirected USB devices.

BACKGROUND

As the value and use of information continues to increase, individuals and businesses seek additional ways to process and store information. One option available to these users is an information handling system or computing system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more information handling systems, data storage systems, and networking systems. The software components may comprise one or more modules that contain instructions that when executed perform one or more functions.

The information handling system may include one or more operating systems. An operating system serves many functions, such as controlling access to hardware resources and controlling the execution of application software. Operating systems also provide resources and services to support application software. These resources and services may include a file system, a centralized configuration database (such as the registry found in Microsoft Windows operating systems), a directory service, a graphical user interface, a networking stack, device drivers, and device management software. In some instances, services may be provided by other application software running on the information handling system, such as a database server.

Some information handling systems are designed to interact with other information handling systems over a network connection. In some instances, the information handling systems may share resources over the network. Certain of the networked information handling systems may act as servers, while others act as clients. In such systems, client applications and client devices may be designed so that the majority of the heavily used resources are at a shared information handling system, such as a centralized server. The client devices may have minimal memory, disk storage, and processor power. Use of such client devices may reduce the total cost of ownership because of the reduced use of resources at the client devices and because the clients can be centrally administered and updated from the server. Such client devices may be particularly well-suited for a network which can handle a significant number of devices.

Virtual desktop infrastructure (VDI) environments may include any one or more information handling systems. A virtual environment, such as a VDI, separates a desktop environment and its associated software in a data center or server, from the information handling system that is used to access the desktop environment. A "virtual desktop" may refer to any number of methodologies including server-based computing (SBC) where a number of users share the desktop of a server-based operating system, VDI where each user gets their own virtual machine which typically runs a client operating system, and application virtualization technologies that concentrate more closely on making specific applications available to users with these applications, for example, being hosted on a remote system or streamed to the user's local system. With respect to the virtual desktop technologies described, SBC is often regarded as being appropriate for task/call-center type environments, while VDI is more commonly deployed for knowledge workers who require a higher level of user personalization, and application virtualization technologies may be commonly deployed across SBC, VDI and physical desktop environments to solve business challenges such as legacy application OS compatibility.

A user may connect any number of devices to any one or more information handling systems. For example, a user may connect one or more USB devices, for example, printers, scanners, mass storage devices, etc. USB redirection technology emulates virtual USB hardware on a virtual USB bus driver on an information handling system, such as a server. Prior universal serial bus (USB) technology utilized in VDI environments emulated virtual USB hardware on a virtual USB bus driver on the server. The operating system of the server loaded a real driver and applications for the virtual USB hardware in the same way as such would be loaded for real physical hardware. When the application tried to access or use a virtual device or virtual hardware, the requests from the application would be translated as transaction requests (USB request blocks) directed to the virtual USB hardware on the server. The virtual USB bus driver redirected the USB request block (URB) transactions to another information handling system, such as a client, where the real physical hardware was actually located. The received transaction requests from the server were then submitted to the real USB hardware via a stub driver on the client. The resulting responses from the real USB hardware would then be transported back to the server and pumped to the virtual USB bus driver. The virtual USB bus driver then passed these responses back to the respective applications via the real driver, thus completing the loop.

One problem with the prior technology is that each additional USB device connected to the network increased network bandwidth. Too many redirected USB devices may bring down the VDI scalability by occupying too much network bandwidth. USB devices may consume a large amount of bandwidth because the URBs are not compressed or are not optimally compressed.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DESCRIPTION

Figure 1:
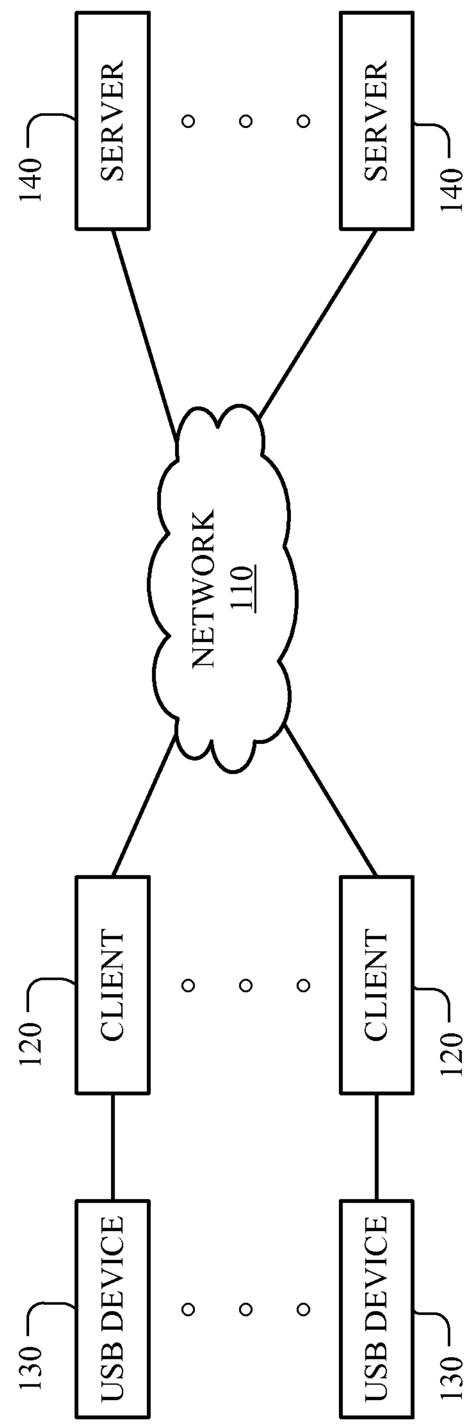
FIG. 1 illustrates an example configuration of networked information handling systems according to one embodiment of the present disclosure.

This disclosure generally relates to remote computing and, in particular, relates to dynamically selecting data compression methods for certain data, such as universal serial bus (USB) request blocks (URB)) for redirected USB devices over a network, for example, a wide-area network (WAN) or a local area network (LAN).

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable storage media may include any instrumentality or aggregation of instrumentalities that may retain data and/or instructions for a period of time. Computer-readable storage media may include, for example without limitation, storage media such as a direct access storage device (for example, a hard disk drive or floppy disk), a sequential access storage device (for example, a tape disk drive), compact disk (CD), CD-ROM, DVD, RAM, ROM, electrically erasable programmable read-only memory (EEPROM), and/or flash memory.

As used herein, a "local" device of a system, or a device "locally" connected to a system, may be a device directly connected to the system using one or more wires or connectors (for example, physically connected to the system), a device indirectly connected to the system using one or more hubs, or a device directly connected to the system using a wireless link. Furthermore, in one aspect of the present disclosure, a local device of a system or a device locally connected to a system may include a device within the system (for example, an internal device).

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

In systems based on the server/client model, certain resources may be shared amongst clients or between clients and servers via a network. For example, in one embodiment the network is a WAN or a LAN. In some circumstances, it may be advantageous to make peripheral devices connected locally at one client device available to one or more other information handling systems on the network.

One type of client information handling system may be a thin client, also known as a lean or slim client. A thin client is a computer or computer program which depends on some other computer, for example, a server, to fulfill at least some of the computational roles required of the thin client. In certain configurations of one or more information handling systems, multiple user may login to the same server. The users may be permitted to work simultaneously even though they may be physically located at separate locations. According to the present disclosure, the users may be permitted to simultaneously access data, applications, and/or hardware associated with the server (or other information handling system). The server itself may be a physical machine or a virtual machine (VM).

A user may access devices redirected to the server as if it is available locally to the user by connecting all the necessary peripherals. For example, the user may connect to universal serial bus (USB) printers, scanners, USB mass storage devices, and any other device known to one of ordinary skill in the art.

According to the present disclosure, individual interfaces associated with a single physical device may be installed locally or may be redirected to another information handling device, such as a server. Interfaces forwarded to the server may be mounted as virtual devices at the server and may be shared with additional information handling systems. In some embodiments, one interface associated with a composite device may be redirected to one server, a second interface may be redirected to a second server, and a third interface may be installed locally.

As an example, if a USB printer/scanner were connected to a given client via a standard USB connection, the locally connected USB printer/scanner may be redirected to the server. The scanner may then be installed locally for use by any number of clients. The server treats the USB printer/scanner as a virtual device attached to the server. Alternatively, the USB printer interface or component could be redirected to one server and the USB scanner interface or component could be redirected to a second server.

FIG. 1 illustrates an example configuration of a networked information handling system. In particular embodiments, one or more client devices 120 and one or more servers 140 are connected via network 110. Many types of peripheral devices may be connected locally to the client devices 120. As shown in FIG. 1, in some embodiments, one or more USB devices 130 connect to the client devices 120. According to the present disclosure, one or more USB devices 130 may appear to one or more of servers 140 as if they are locally installed on and connected to those servers 140. In certain embodiments, these USB devices 130 may be redirected such that they appear to be locally installed or locally shared with another client device 120. In one or more embodiments, one or more interfaces of one or more USB devices 130 may appear to one or more servers 140 as if they are locally installed on and connected to those servers 140, while other interfaces associated with USB devices 130 may be locally installed on their respective client devices 120. In some cases, interfaces associated with a USB device 130 on one client device 120 may be redirected such that it appears to be locally installed or remotely shared with another client device 120.

Figure 2:
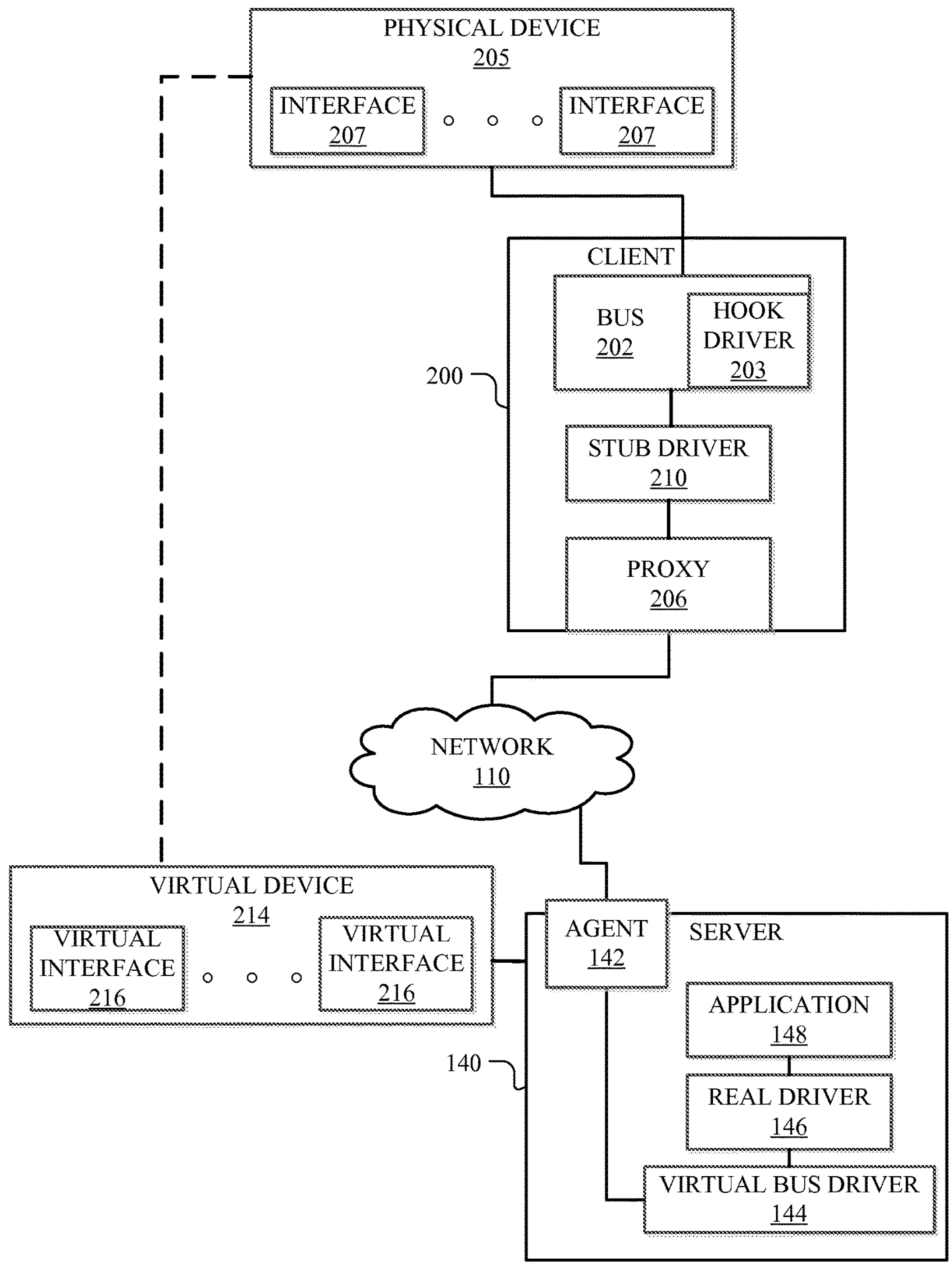
FIG. 2 illustrates example system of a networked client and server that supports dynamically selecting data compression methods for a redirected USB device according to one embodiment of the present disclosure.

FIG. 2 illustrates an example embodiment of a system configured to redirect a physical device 205, for example, a USB device. In a particular embodiment, the configuration shown in FIG. 2 illustrates a virtual environment that may include one or more of Virtual Desktop Infrastructure (VDI) environment, Server-Based Computing (SBC) environment, and application virtualization technologies. This disclosure contemplates any number of virtual environments as known to one of ordinary skill in the art. As a result of the suitability of these technologies for different user types, many organizations are choosing to implement a hybrid approach that uses each of the technologies including using multiple vendors within each technology. The decision as to which users to allocate to which technology type may be difficult in advance of any actual implementation of a particular technology for a particular user.

In particular embodiments, client device 200 connects to server 140 via network 110. Client device 200 recognizes physical device 205, which is connected locally, such as a USB device. Physical device 205 may have one or more interfaces 207. When physical device 205 is initially connected to client device 200, client device 200 may attempt to initialize physical device 205 by attempting to load a driver. According to the present disclosure, client device 200 may determine (or may permit a user to determine) whether to redirect physical device 205 or to redirect one or more interfaces 207 associated with physical device 205 upon connection of the physical device 205, as part of the initialization of physical device 205. In particular embodiments, client device 200 may make a new determination regarding the installation of physical device 205 after physical device 205 has been initialized. For example, a user may decide that the physical device 205 or an interface 207 of physical device 205 that was previously installed on its local client device 200 should be redirected to server 140.

In the example embodiment shown in FIG. 2, a redirection hook driver 203 hooks a bus 202 associated with the operating system running on client device 200. Hook driver 203 may interrupt the automatic operation of the operating system, since the operating system may be configured to automatically identify a driver for composite device 205 and attempt to install composite device 205 locally. In particular embodiments, hook driver 203 may change a device identifier associated with physical device 205.

The devices associated with interfaces 207 may be composite devices. In such cases, the virtual devices will be identified as composite devices, but may have fewer interfaces 207 associated with them than the total number of interfaces associated with physical composite device 205. For example, a first device may be identified as a USB printer/scanner composite device, but the virtual device may only have a single interface 207, such as the printer interface. A second device may be created (likewise identified as a composite device) for the scanner interface.

Client device 200 may be configured to automatically install all or only certain physical devices 205 or interfaces 207 locally, or may be configured to automatically redirect all or certain physical devices 205 or interfaces 207 to server 140, or may be configured to request input from a user of client device 200 or from another source to determine whether to install a particular physical device 205 or interface locally or to redirect it. Certain physical devices, such as hubs, may also be precluded from redirection.

If a physical device 205 or an interface 207 is configured to be redirected to server 140, the redirection may operate generally as described in U.S. Pat. No. 8,010,630 to Barreto, et al., which is incorporated herein by reference. A proxy module 206 on client device 200 may coordinate communications between physical device 205 and an agent 142 running on server 140. In particular, proxy 206 may be configured to receive socket connection information from server 140 and initiate redirecting device transactions to and from physical device 205 to agent 142 on server 140.

Agent 142 may be configured to register with the operating system of server 140 to receive notification of an establishment of a remote access connection between virtual device 214 and server 140. When agent 142 receives the notification, it can determine what devices have connected to server 140 and when they connected, and can thus determine when and from where the local device redirection is to be initiated.

Virtual bus driver 144 receives information about redirected physical device 205 or interface 207 from agent 142. Virtual bus driver 144 then calls device driver (real driver) 146 associated with physical device 205 or interface 207, which completes the initialization of the virtual device 205 on server 140. The virtual device 214 associated with redirected physical device 205 or redirected interface 207 then functions as if the redirected physical device 205 or the redirected interface 207 of physical device 205 were locally connected to server 140 (as indicated by the dashed line between physical device 205 and virtual device 214). The virtual device 214 associated or the virtual interface 216 associated with redirected interface 207 may thus be made available to application 148 running on server 140, which can treat the virtual device 214 or the virtual interface 216 as a local device or local interface, respectively. The virtual device 214 may be a redirect USB device, for example, physical device 205.

In order for an interface 207 to work properly as a virtual device, it may be necessary under some operating systems to instruct the operating system that the virtual device does not include all interfaces 207 associated with physical device 205. This may be unnecessary in certain circumstances when the virtual device is presented as a physical device, but may be preferable to specifically instruct the operating system in this manner at least when the virtual device is identified as a single non-composite device.

The application 148 may make requests to access one or more virtual devices 214, such as one or more virtual USB devices. These requests are translated as transaction requests or URBs directed to the virtual device 214 at the server 140. The virtual bus driver 144, such as a virtual USB bus driver, redirects the URBs to the client device 200 where the associated physical device 205 is located. These requests from the server 140 are transmitted to the associated physical device 205 via a stub driver 210. The responses from the associated physical device 205 are transmitted back to the server 140 and pumped to the virtual bus driver 144. The virtual bus driver 144 passes the responses back to the respective applications 148 via the real driver 146.

Figure 3:
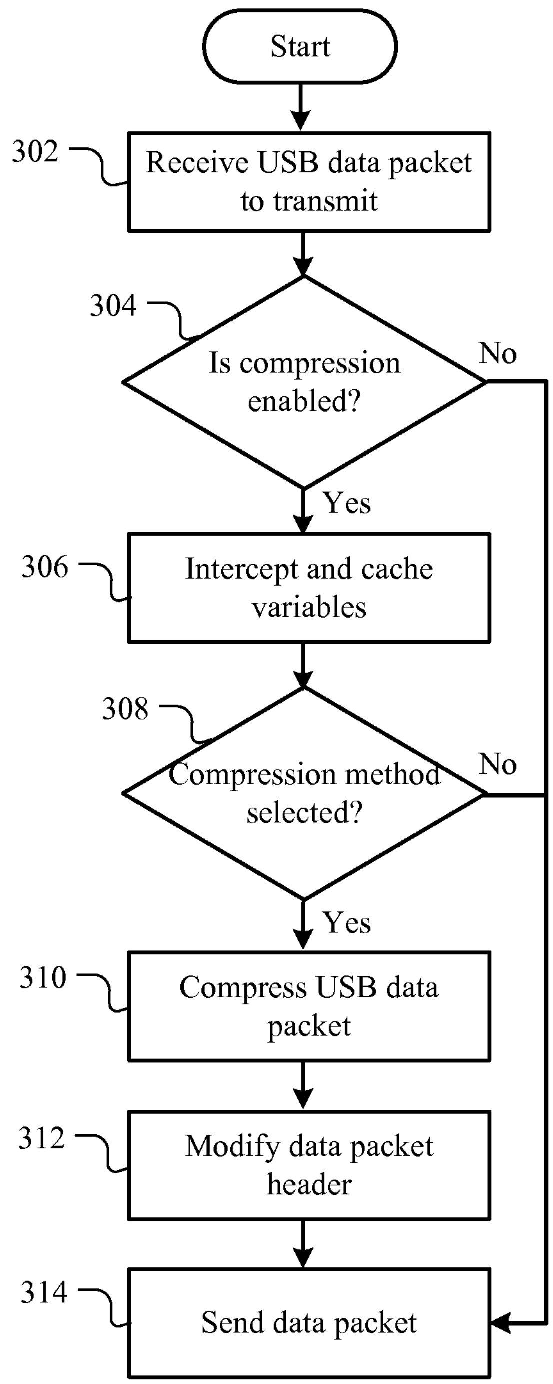
FIG. 3 illustrates an example of steps involved in one method of dynamically selecting data compression methods for a redirected USB device according to one embodiment of the present disclosure.

FIG. 3 is a flow chart in accordance with an embodiment of the present disclosure. A USB bus driver of information handling system, such as information handling system 500 of FIG. 5, may receive a USB data packet associated with a USB device that needs to be transmitted over the network 110. The information handling system 500 may be a server 140 or a client 200 or any other information handling system known to one of ordinary skill in the art. The USB device may be a physical USB device, such as physical device 205, or a virtual USB device, such as virtual device 214. If the USB device is a physical device 205, then the bus 202 receives the USB data packet. If the USB device is a virtual device 214, then the server virtual bus driver 144 receives the USB data packet.

At step 304, it is determined if compression is enabled for the USB device. The compression may be enabled by a predetermined setting. For example, a user, such as an administrator, may set compression enabled for one or more USB devices associated with the information handling system 500 or any other way known to one of ordinary skill in the art. If compression is not enabled, the data packet is sent over the network at step 314. If compression is enabled then the bus driver intercepts and caches one or more variables associated with the USB device. For example, the USB device type and class, the URB control/data phase and URB function type may be intercepted (or parsed) and cached. The variables may be stored in a memory, such as memory 504 or storage 506 or any other storage location known to one of ordinary skill in the art.

Next at step 308 a compression method is dynamically selected. The compression method selected is based, at least in part, on one or more criteria. In one embodiment at least one criteria is the available compression methods of the information handling system 500. In another embodiment, at least one criteria is the type of data in the data packet to be compressed. In one embodiment the compression methods may be part of the header. For example, data related to a picture or a movie may be best compressed using JPEG2000 compression while data related to text or readings from one or more sensors may best be compressed using LZ4 compression. If no compression method is selected, the data packet is sent at step 314 uncompressed.

If a data compression method is selected, then at step 310, the USB data packet is compressed by the appropriate component (the agent 142 of server 140 for a virtual device 214 or proxy 206 of client 200 for physical device 205) according to the selected compression method. The USB data packet may be one or more packets of data that includes one or more headers. At step 312, the data packet header is modified, at least in part, to indicate that compression is enabled and the compression method used. At step 314, the data packet (compressed or uncompressed) is sent to the network 110 to be transmitted to either the USB device that requested the data or the software/application that requested the data.

In one embodiment, an application 148 running at a server 140 requests to write data to a virtual device 214. The virtual bus driver 144 will receive the write data (step 302) and determine if compression is enabled (step 304) for the associated virtual device 214. If compression is enabled, the virtual bus driver 144 will intercept and store the variables that indicate the USB device type and class, the URB control/data phase and the URB function type associated with the write data according to step 306. The virtual bus driver 144 next selects a compression method (see step 308). The write data is compressed by the agent 142 of server 140 for the virtual device 214 according to the selected compression method (step 310) and the data packet header associated with the write data is modified to include, at least, that compression is enabled and the compression method (step 312). The write data that has been compressed and that includes a modified header is sent (step 314) to the agent 142 for transmission over the network 110 to the proxy 206 where it will eventually be decompressed (as illustrated in FIG. 4) by the physical device 205.

In another embodiment, the USB data packet received is a request to read data. The steps 302 through 314 are performed in a similar manner as for the write data except that the read data is compressed by proxy 206 of client 120 and received by agent 142 of server 140.

Figure 4:
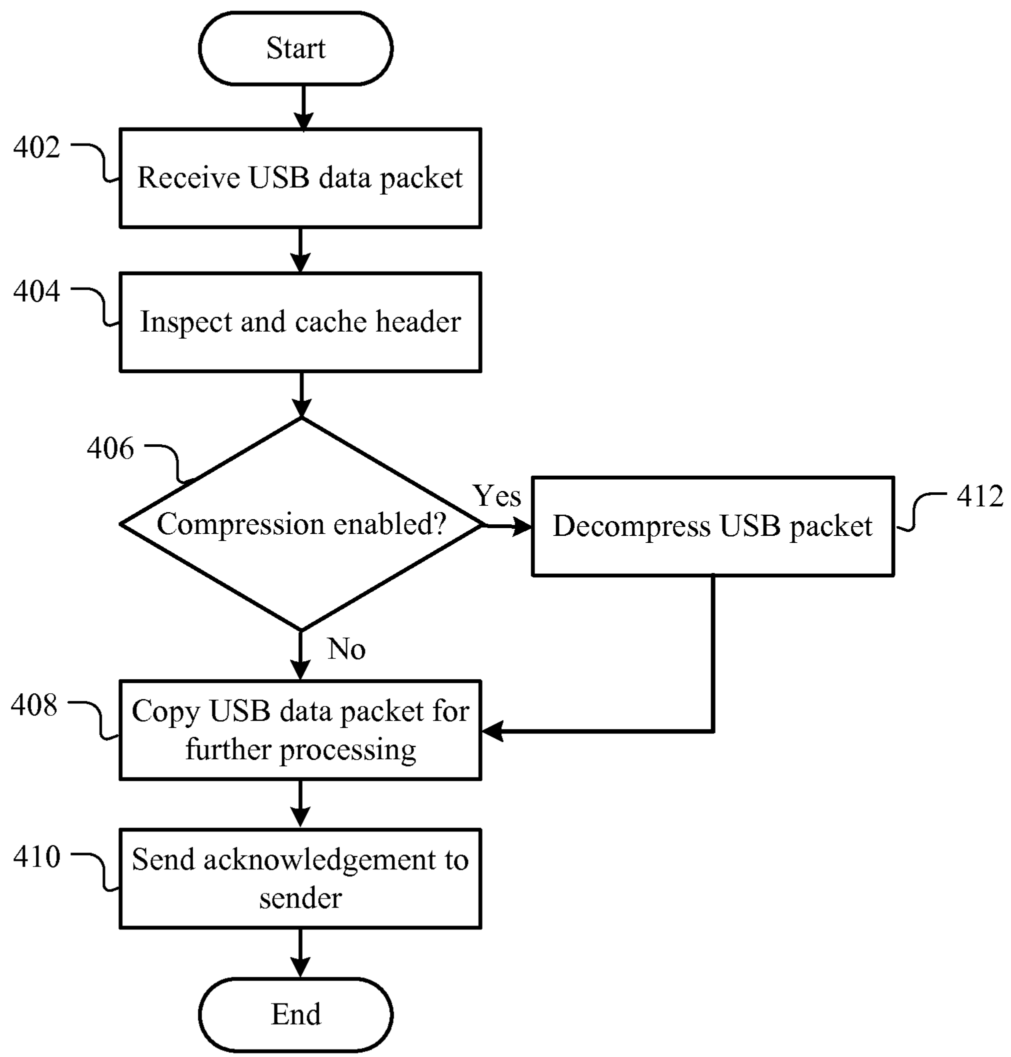
FIG. 4 illustrates an example of steps involved in one method according to the present disclosure.

FIG. 4 is a flow chart in accordance with an embodiment of the present disclosure. At step 402, a transmitted USB data packet is received by agent 142 (for read data) or by proxy 206 (for write data). At step 404, one or more variables of the header of the USB data packet are inspected (or parsed) and cached. For example, variables associated with whether compression is enabled and the method of compression are stored in the same or similar manner as discussed with respect to the variables at step 306 of FIG. 3.

Next at step 406 it is determined whether compression is enabled. For example, a bit in the data packet header may indicate that the data associated with the data packet (USB request payload) is compressed or not compressed. In one embodiment, a bit is set if that USB request payload is compressed and not set if it is not compressed. If compression is enabled, then at step 412 the USB packet, or rather the USB request payload, is decompressed according to the compression method indicated by the data packet header. Next, or if compression is not enabled, the method proceeds to step 408 where a copy of the USB data packet is made for further processing. For example, if the USB data packet is received at the proxy 206 (for write data), the USB data packet is posted to the stub driver 210 and then the USB data packet is transmitted to the physical device 205. In another example, if the USB data packet is received at agent 142 (for read data), the USB data packet is posted to virtual bus driver 144 and then the USB data packet is transmitted to the upper layer drivers and applications.

Then at step 410, an acknowledgement is sent to the sender of the USB data packet. In one embodiment, the client 200 via proxy 206 would send an acknowledgement to the server 140 via agent 142. In another embodiment, the server 140 via agent 142 would send an acknowledgement to the client 200 via proxy 206.

In one embodiment, a client 200 receives a USB write data packet from server 140 (step 402). The USB write data packet header indicates that the USB request payload has been compressed (compression bit is set) and identifies the compression method (see steps 404, 406). Since compression is enabled, the USB request payload is decompressed according to the compression method identified in the USB write data packet header (step 412). The USB write data packet is copied for further processing (step 408) and an acknowledgement is sent back to the server 140 via agent 142 (step 410).

In another embodiment, a server 140 receives a USB read data packet from a client 200 (step 402) (where the client

200 may or may not be coupled to the physical device 205) in response to a request for data from the physical device 205. The USB read data packet header indicates that the USB request payload has been compressed (compression bit is set) and identifies the compression method (see steps 404, 406). Since compression is enabled, the USB request payload is decompressed according to the compression method identified in the USB read data packet header (step 412). The decompressed data is then transmitted to the one or more requesting applications. The USB read data packet is copied for further processing (step 408) and an acknowledgement is sent back to the client 200 via proxy 206 (step 410).

By compressing the packet data according to the type of data a reduction in network bandwidth may be achieved. For example, reduced network bandwidth consumption of redirected physical devices is realized as less traffic is transmitted over the network because the data packets have been compressed using the most suitable compression method available.

Figure 5:
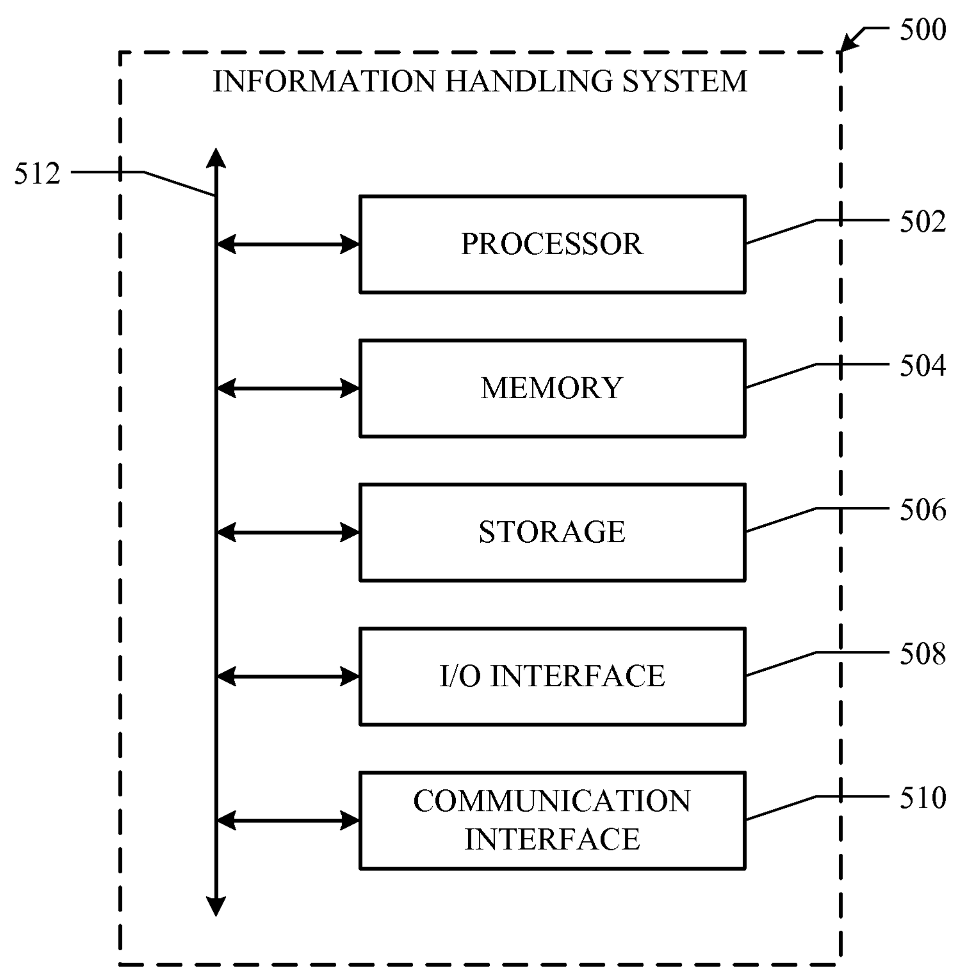
FIG. 5 illustrates an example computing system according to one embodiment of the present disclosure.

Particular embodiments may be implemented on one or more electronic devices or information handling systems. FIG. 5 illustrates an example information handling system, information handling system 500. For example, information handling system 500 may be an embodiment for a device that runs a UI content editor. In particular embodiments, one or more information handling systems 500 perform one or more steps of one or more methods described or illustrated herein. In particular embodiments, one or more information handling systems 500 provide functionality described or illustrated herein. In particular embodiments, software running on one or more information handling systems 500 performs one or more steps of one or more methods described or illustrated herein or provides functionality described or illustrated herein. Particular embodiments include one or more portions of one or more information handling systems 500.

This disclosure contemplates any suitable number of information handling systems 500. This disclosure contemplates information handling system 500 taking any suitable physical form. As an example and not by way of limitation, information handling system 500 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, or a combination of two or more of these. Where appropriate, information handling system 500 may include one or more information handling systems 500; be unitary or distributed; span multiple locations; span multiple machines; or reside in a cloud, which may include one or more cloud components in one or more networks. Where appropriate, one or more information handling systems 500 may perform without substantial spatial or temporal limitation one or more steps of one or more methods described or illustrated herein. As an example and not by way of limitation, one or more information handling systems 500 may perform in real time or in batch mode one or more steps of one or more methods described or illustrated herein. One or more information handling systems 500 may perform at different times or at different locations one or more steps of one or more methods described or illustrated herein, where appropriate.

In particular embodiments, information handling system 500 includes a processor 502, memory 504, storage 506, an input/output (I/O) interface 508, a communication interface 510, and a bus 512. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, information handling system 500 may load instructions from storage 506 or another source (such as, for example, another information handling system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a USB drive or a combination of two or more of these. Storage 506 may include removable or non-removable (or fixed) media, where appropriate. Storage 506 may be internal or external to information handling system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between information handling system 500 and one or more I/O devices. Information handling system 500 may include one or more of these I/O devices, where appropriate. One or more of these I/O devices may enable communication between a person and information handling system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between information handling system 500 and one or more other information handling systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, information handling system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of information handling system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

The concepts disclosed in this application should not be understood to be limited to the exemplary embodiments described herein, but should be understood to encompass all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:

receiving at a first information handling system a universal serial bus (USB) data packet to be transmitted, wherein the USB data packet comprises a header and a payload;

determining if compression is enabled;

caching one or more variables associated with a header of the USB data packet;

dynamically selecting a compression method, based, at least in part, on one or more criteria;

compressing the payload;

modifying the header, wherein modifying the header comprises setting a compression enabled variable of the header to indicate that compression is enabled; and sending the compressed payload and the modified header as a compressed data packet.

2. The method of claim 1, wherein modifying the header comprises setting a compression method variable of the header to indicate compression method of the compressed payload.

3. The method of claim 1, wherein determining if compression is enabled comprises determining a value of a user-specified setting.

4. The method of claim 1, wherein the compression method comprises one of LZ4 and JPEG2000.

5. The method of claim 1, wherein selecting the compression method comprises determining a type of data of the payload.

6. The method of claim 1, wherein the cached variables include at least one of USB device type, USB device class, USB request block (URB) control phase, and URB function type.

7. A system comprising:

a first server;

one or more central processing units for processing information of the first server;

a memory of the first server communicatively coupled to the one or more central processing units; and one or more modules that comprise instructions stored in the memory, the instructions, when executed by the one or more processing units, operable to perform operations comprising:

receiving at a first information handling system a universal serial bus (USB) data packet to be transmitted, wherein the USB data packet comprises a header and a payload;

determining if compression is enabled;

caching one or more variables associated with a header of the USB data packet;

dynamically selecting a compression method, based, at least in part, on one or more criteria;

compressing the payload;

modifying the header, wherein modifying the header comprises setting a compression enabled variable of the header to indicate that compression is enabled; and sending the compressed payload and the modified header as a compressed data packet.

8. The system of claim 7, wherein modifying the header comprises setting a compression method variable of the header to indicate compression method of the compressed payload.

9. The system of claim 7, wherein determining if compression is enabled comprises determining a value of a user-specified setting.

10. The system of claim 7, wherein the compression method comprises one of LZ4 and JPEG2000.

11. The system of claim 7, wherein selecting the compression method comprises determining a type of data of the payload.

12. The system of claim 7, wherein the cached variables include at least one of USB device type, USB device class, USB request block (URB) control phase, and URB function type.

13. A computer-readable non-transitory storage media embodying software that when executed causes a processor of an information handling system to:

receive a universal serial bus (USB) data packet to be transmitted, wherein the USB data packet comprises a header and a payload;

determine if compression is enabled;

cache one or more variables associated with a header of the USB data packet;

select, dynamically, a compression method, based, at least in part, on one or more criteria;

compress the payload;

modify the header, wherein modifying the header comprise setting a compression enabled variable of the header to indicate that compression is enabled; and send the compressed payload and the modified header as a compressed data packet.

14. The media of claim 13, wherein the modify the header step comprises setting a compression method variable of the header to indicate compression method of the compressed payload.

15. The media of claim 13, wherein the determine if compression is enabled step comprises determining a value of a user-specified setting.

16. The media of claim 13, wherein the compression method comprises one of LZ4 and JPEG2000.

17. The media of claim 13, wherein the select the compression method step comprises determining a type of data of the payload.

* * * * *